United States Patent
Johnson

[15] 3,653,760
[45] Apr. 4, 1972

[54] APPARATUS FOR COPYING PHOTOGRAPHIC TRANSPARENCIES

[72] Inventor: Bruce K. Johnson, Andover, Mass.
[73] Assignee: Polaroid Corporation, Cambridge, Mass.
[22] Filed: Dec. 18, 1970
[21] Appl. No.: 99,348

[52] U.S. Cl. ........................... 355/39, 95/1.1, 95/12, 355/63, 355/67
[51] Int. Cl. .......................................... G03b 27/62
[58] Field of Search ............... 95/1, 1.1, 12; 355/39, 63, 355/62, 75, 67; 353/63

[56] References Cited

UNITED STATES PATENTS

| | | | |
|---|---|---|---|
| 803,385 | 10/1905 | Wynne | 353/63 |
| 2,180,007 | 11/1939 | Hopkins | 355/75 |

FOREIGN PATENTS OR APPLICATIONS 3,058   1903   Great Britain .................. 95/11 S Primary Examiner—Samuel S. Matthews
Assistant Examiner—E. M. Bero
Attorney—Brown and Mikulka, Gerald L. Smith and William D. Roberson

[57] ABSTRACT

Photographic apparatus for copying the image of a scene recorded upon a photographic transparency used in conjunction with a camera of the self-developing variety having a mounted source of artificial illumination. The apparatus directs light from the source along a folded optical path and into the camera lens. A concave mirror is positioned within the path optically coaxial with the camera lens and the transparency and serves to magnify the image thereof without aberration.

19 Claims, 7 Drawing Figures

INVENTOR.
BRUCE K. JOHNSON
BY Brown and Mikulka
ATTORNEYS

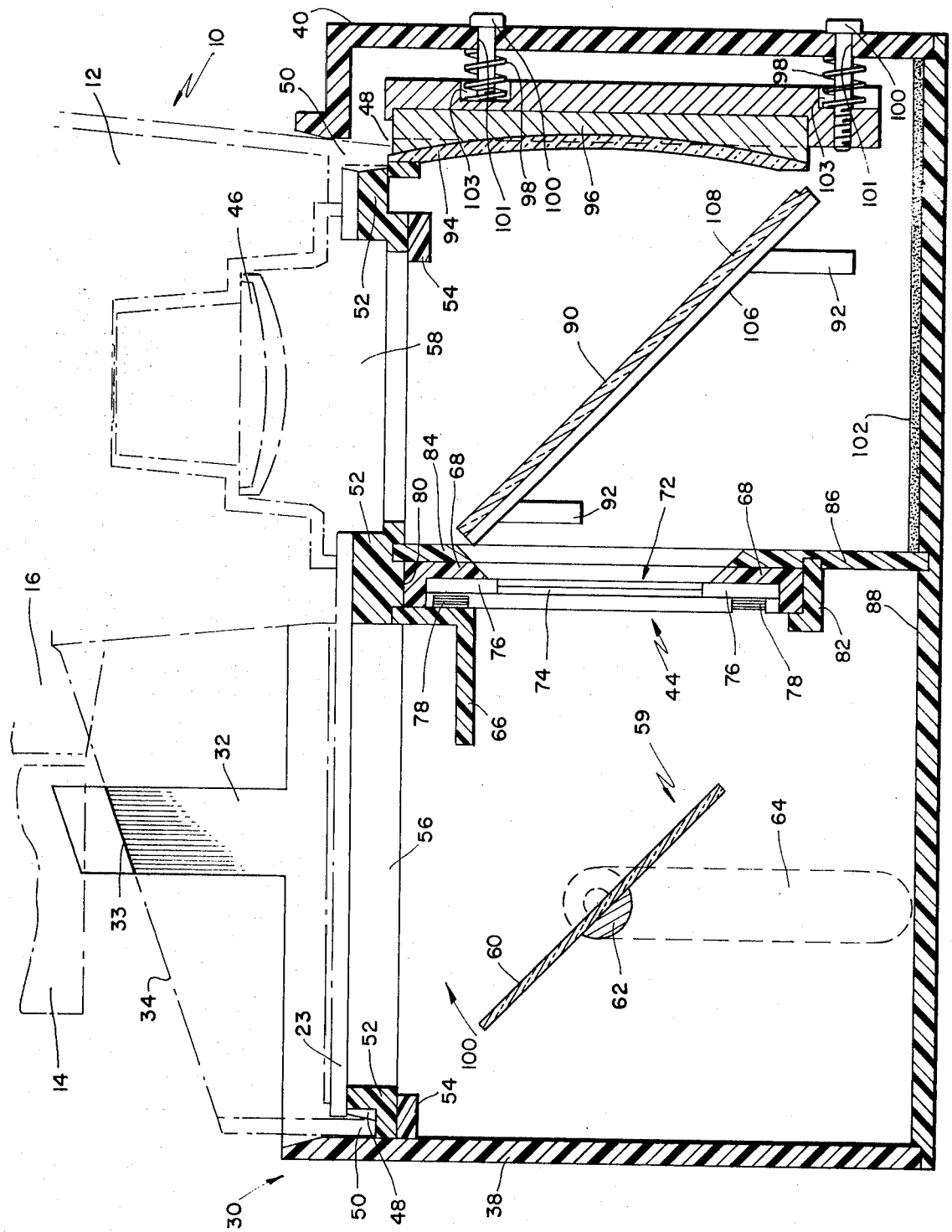

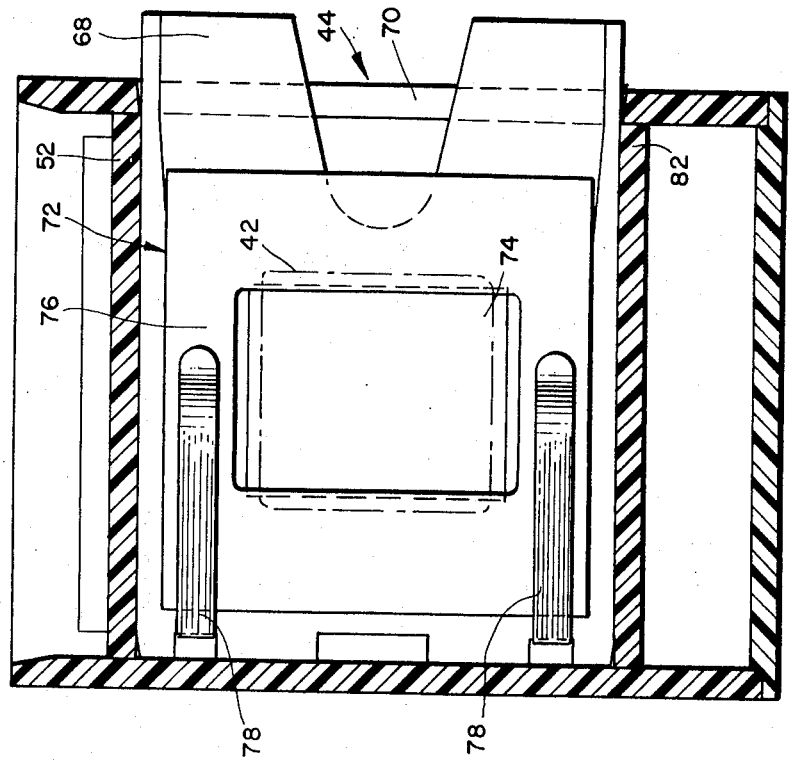
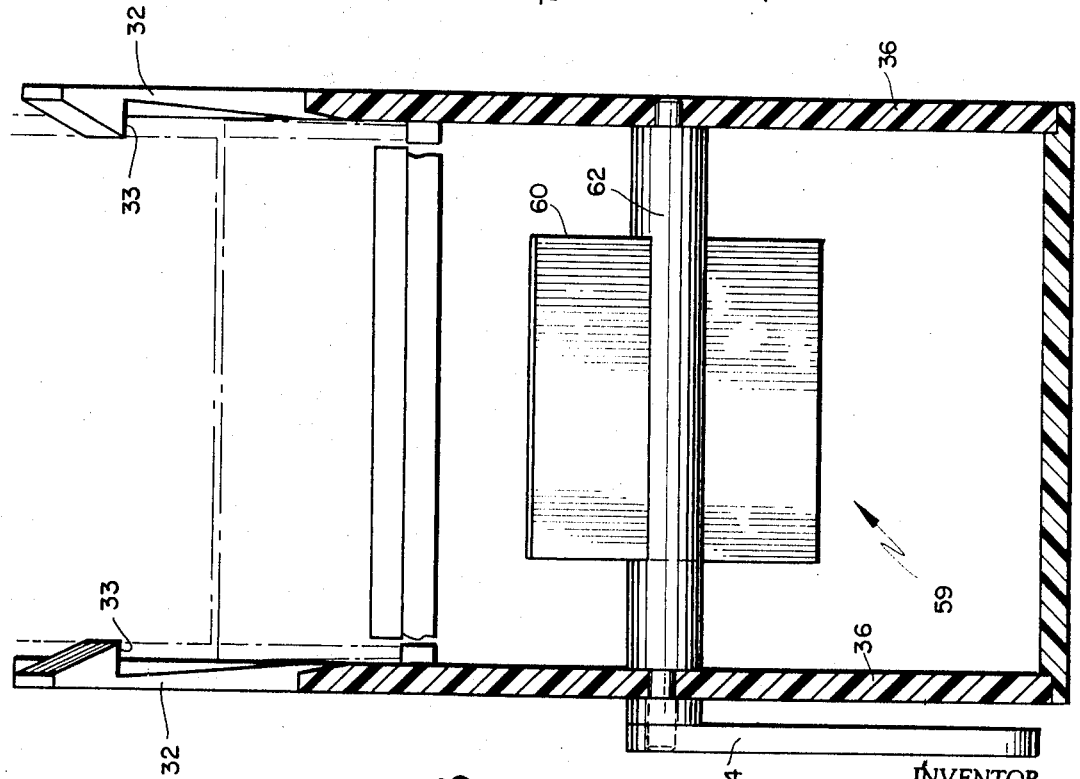

INVENTOR.
BRUCE K. JOHNSON
BY Brown and Mikulka
ATTORNEYS $$\frac{\text{PRIMARY REFLECTION}}{\text{SECONDARY REFLECTION}} = \frac{9\%}{.1\% + .1\%} = \frac{45}{1}$$

INVENTOR.
BRUCE K. JOHNSON
BY Brown and Mikulka
ATTORNEYS

APPARATUS FOR COPYING PHOTOGRAPHIC TRANSPARENCIES

BACKGROUND OF THE INVENTION

Copies of photographic transparencies are generally procured by forwarding the original transparency or slide to a commercial copying enterprise. These enterprises, using sophisticated equipment and techniques, copy the slide, or make magnified prints, and return the original and its copy to the sender by mail. This procedure necessarily involves an unwanted lapse of time.

Various copying systems have been introduced into the amateur market which are operated as attachments to conventional cameras. While allowing the photographer to copy an original slide, for the most part, such attachments are limited to providing for a one-to-one ratio of reproduction.

Because of the small or miniature format of popular transparencies, any practical print copy of an original should be magnified at least to snapshot size. Unfortunately, however, providing magnification features in a copier introduces several technical complications. For instance, since most popular transparencies are made with color film, any magnifying and copying device must be designed to accommodate for chromatic as well as spherical aberrations. As a consequence, refracting optical systems used with the copier must incorporate various corrective design features. Such corrections add significantly to the cost of such copying systems. Additionally, magnifying copying lens systems, suited for use in conjunction with conventional cameras, necessarily restrict the depth of field available within the combined copier attachment—camera system. As a result, copying must be carried out with cameras having precise and more expensive viewing systems in order to provide necessary critical focusing.

In order to obtain a reasonably magnified and good-quality print copy of a typical photographic color transparency, the refractive optical system required becomes both bulky and expensive. The cost of such a system would render it impractical for introduction into the amateur market. It follows that a chromatic aberration-free and magnifying copying attachment of reasonably low cost for use with conventional cameras would be most desirable. Moreover, such an attachment should be operative in conjunction with inexpensive or popularly priced cameras. A particularly desirable feature for such an inexpensive copier attachment would reside in providing for its use in conjunction with popularly priced, instant-developing cameras.

SUMMARY OF THE INVENTION

The present invention is addressed to photographic apparatus for use in making magnified copies of photographic transparencies or "slides." The apparatus incorporates a reflective magnification system which magnifies free of chromatic aberrations and with broadened latitudes of depth of field. Of simple construction, the apparatus is both inexpensive and easily operated in conjunction with relatively inexpensive cameras, including those of a self-developing variety. The use of a slide-copying attachment with a self-developing camera ideally provides an immediate copy.

In an important embodiment of the present invention, the slide-copying attachment is operable with a fixed-focus, relatively long focal length camera having an integrally mounted source of flash illumination, such as a "flash cube." By using such a source of artificial illumination for copying purposes, the need for corrective filters is obviated. This result stems from the color temperature compatibility of conventional flash lamps with that required for color transparency projection and copying. By using the copier attachment with a camera having a relatively long focal length, there is realized a minimization of spherical aberrations and adequate depth of field performance at requisite focal distances.

In providing for requisite image magnification, the copying attachment of the invention includes a concave mirror positioned optically coaxial with the camera lens. This mirror is spaced from the transparency and is configured to magnify the image imposed upon it from the transparency. The magnified image is then reflected back along the optical path from which it came toward the camera lens. The photographic transparency is spaced from the concave mirror a distance less than the focal length of the concave mirror. This results in the formation of a virtual image which is coextensive with the given field of view of the camera at its focal distance.

Positioned between the photographic transparency and the concave mirror is a half-silvered mirror. While serving a light path folding function to establish needed focal distance, this mirror allows light to pass from the slide to the concave mirror with minimal interference. The half-silvered mirror is positioned in such a manner as to reflect the magnified image from the concave mirror toward the camera lens.

Due to the select positioning of the transparency in relation to the concave mirror, the camera lens will be focused on a virtual image at a distance equal to its focal distance. The enlarged virtual image will be of a size comparable to the field of view of the camera at its focal distance. In this manner, the virtual image produced from the concave mirror will always be in focus, and a magnified enlargement of the transparency image will be focused at the exposure plane of the camera.

Chromatic aberrations are eliminated in the present invention due to the fact that reflective magnification element is used. Concave mirrors, unlike lens systems, can be produced for achromatic optical performance with minimal spherical aberrations. Additionally, by using a mirror, a low-production cost may be realized as compared to an expensive lens counterpart.

By using a standard output flash lamp mounted upon a fixed-focus camera, the present invention minimized pre-exposure operator settings. The only functions which the operator must assume are inserting the transparency within the attachment, angularly varying a reflecting surface for diffusing the flash cube light in accordance with slide density, and depressing the shutter button of the camera.

In another embodiment of the present invention, a real and magnified image is projected toward and focused at the exposure plane of a camera. To accomplish this, the transparency to be copied is spaced from the earlier-described concave mirror a distance greater than the focal length thereof. The prismatic properties of the taking lens of the camera are nullified by positioning a negative lens before it. This optical adjustment permits the projection of a real image of appropriate magnification to the exposure plane of the camera, i.e., the image which is produced at the exposure plane of the camera is of the same size as the film format.

One feature and object of the present invention is to provide an inexpensive and portable photographic apparatus for making magnified copies of transparencies and which can be used with inexpensive, self-developing cameras.

Another feature and object of the present invention is to provide a photographic apparatus for copying transparencies which is easily operated with minimal preliminary settings and operator steps necessary to produce such a copy.

A further feature and object of the present invention is to provide a photographic apparatus for use in making magnified copies of photographic transparencies which uses an image-magnification system substantially free of chromatic and spherical aberrations.

An additional feature and object of the present invention is to provide a photographic apparatus for copying the image of a scene recorded upon a photographic transparency using a photographic camera having a taking lens and a mounted source of artificial illumination; the apparatus consisteing of a housing which directs light along a path from the source of artificial illumination toward the taking lens of the camera, a variable light diffusing surface, and a reflective magnification system optically coaxial with the taking lens and spaced from the transparency so as to derive a virtual image thereof which is coextensive with the field of view of the camera, whereby a magnified image of the transparency may be recorded at the exposure plane of the camera.

A further feature and object of the present invention is to provide a photographic apparatus for use in making magnified copies of photographic transparencies which uses a reflective magnification system spaced from the transparency so as to derive a real image thereof which is projected toward and focused at the exposure plane of a camera.

Other objects of the invention will in part be obvious and will in part appear hereinafter.

The invention accordingly comprises the apparatus possessing features, techniques, and properties which are exemplified in the description to follow hereinafter.

For a fuller understanding of the nature and objects of the invention, reference should be made to the following detailed description taken in connection with the accompanying drawings.

BRIEF DESCRIPTION OF THE DRAWINGS

FIG. 2 is a sectional view of the apparatus of the invention taken through the plane of line 2—2 in FIG. 1;

FIG. 3 is a sectional view of the apparatus of the invention taken through the plane of line 3—3 in FIG. 1;

FIG. 4 is a sectional view of a portion of the apparatus of the invention taken through the plane of line 4—4 of FIG. 1;

DETAILED DESCRIPTION OF THE INVENTION

Figure 1:
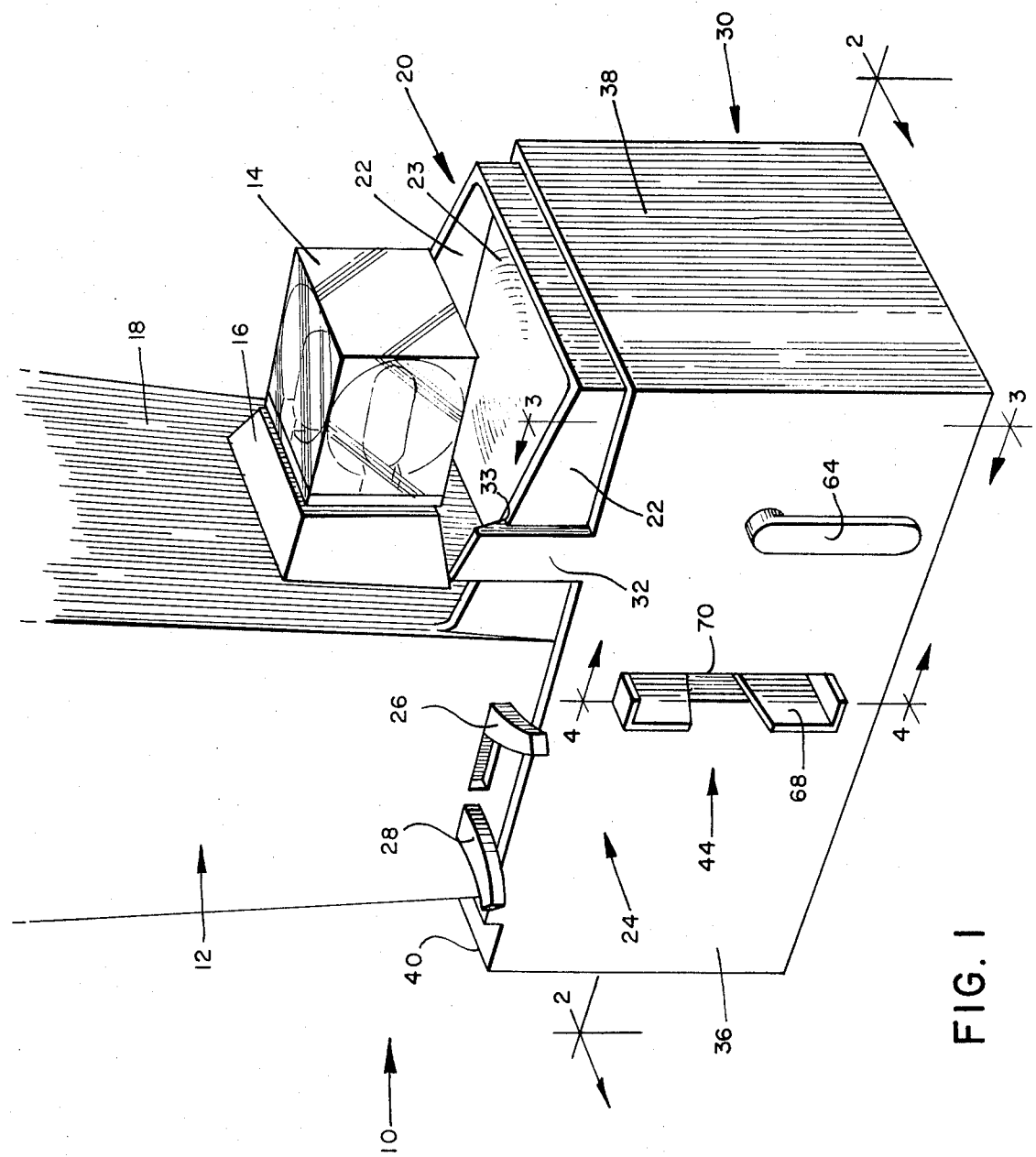
FIG. 1 is a pictorial representation of the apparatus of the invention including the forward portion of a camera having a taking lens and a mounted source of artificial illumination.

In its preferred embodiment, the photographic copier is releasably connected to the front of a long focal length camera of a fixed focus variety. Referring to FIG. 1, a camera suited for engagement with the apparatus of the invention is illustrated generally at 10. Described in detail in a copending application for United States Patent entitled, "Portrait Camera Having Synchronization Flash Illumination Source," by Bruce K. Johnson, Ser. No. 50,648, filed June 29, 1970, and assigned in common herewith, camera 10 is characterized by the presence of an elongated exposure chamber, a portion of which is shown at 12. Exposure chamber 12 is of a rectangular cross section and forms part of the imaging system of the camera. The exposure chamber 12 extends from, and is integrally formed with, a film-receiving portion (not shown) which functions to removably retain a quantity of photosensitive material or film for sequential exposure at an exposure plane.

Camera 10 includes a forwardly disposed mounting arrangement for a conventional flash cube at 14. Flash cube 14 is releasably retained upon an elevated platform 16 integrally formed as a part of top portion 18 of camera 10. Positioned in front of flash cube 14, and formed as a part of exposure chamber 12, is a rectangular lens supporting structure shown generally at 20 forward in the direction of the optical axis of the camera. Supporting structure 20 is formed having side or wing portions 22 and retains a Fresnel-type lens 23 for imparting control over light distributed from flash cube 14. Positioned on the side of exposure chamber 12 is a shutter release assembly shown generally at 24. The shutter assembly includes a trigger member 26 which is manually depressed to activate the camera shutter (not shown) as well as to synchronously activate a lamp contained within flash cube 14. Movable trigger member 26 is arranged to cooperate with a stationary trigger element 28 fixedly attached to chamber 12. Thus configured, the shutter triggering arrangement permits element 26 to be manually squeezed against stationary element 28 while manual support of the camera is provided. As a result, relative camera movement is minimized.

A preferred embodiment of the transparency apparatus of the invention is shown generally at 30. Copying attachment 30 is rectangularly configured so as to be conveniently attached to the forward portion or face of camera 10. The attachment 30 is formed having a rectangularly shaped housing comprised of side walls 36 and end walls 38 and 40. The dimension of these walls is selected such that the attachment 30 may be slideably inserted over the forward face of the camera 10. Attachment 30 is retained in position on the camera by resilient engaging members as at 32 formed integrally with the side walls 36. Members 32 are configured having an engaging surface as at 33 which abuttedly contacts the edge of wings 22. A portion of a mounted transparency of slide-supporting structure is shown generally at 44 extending outwardly from side wall 36.

Referring the FIG. 2, the internal structure of copier 30 is shown in more elaborate detail. When properly mounted on camera 10, copier 30 provides a lighttight arrangement for establishing a light path from a flash lamp contained within flash cube 14 to a camera taking lens as at 46. A slideable supporting union between camera 10 and copier 30 is achieved with a peripheral groove 48 which is configured to accept a lip 50 extending about the frontal edge of camera 10. The insertion of lip 50 into groove 48 assures the operator of an adequately lighttight and properly oriented connection between camera 10 and copier 30. Positioned at the upward portion of copier 30 is a support or face plate 52. Plate 52 is retained in this upward position by supporting tabs 54 connected to side walls 36. Supporting plate 52 is configured to appropriately nest with the front portion of camera 10. Accordingly, the plate 52 is formed having a square opening 56, positioned opposite flash cube 14, and a circular opening 58 positioned opposite taking lens 46. Openings 56 and 58, respectively, provide an entrance and exit, which allow light from flash cube 14 to pass through copier 30 and into taking lens 46.

Pivotally mounted within copier 30, opposite flash cube 14, is a light diverting or reflecting assembly 59, one face of which supports a diffuse reflecting surface 60 for redirecting light from the flash cube transverse to the optical axis of the camera. Assembly 59 is mounted upon an axle 62 extending between side walls 36. Connected to axle 62 outside of copier 30 is a lever 64. Hand-adjustment of lever 64 results in a corresponding angular re-orientation of assembly 59 and surface 60.

Slide-supporting structure 44 is positioned between openings 56 and 58 and includes a slideable transparency retainer assembly 68 which extends through an opening in side wall 36 and serves to temporarily position a transparency, as at 72, within the light path of the apparatus. A photographic transparency or "slide" 72 contains a transparent portion 74 carrying a photographic record of a scene and a cardboard mounting portion 76. Slide 72 is retained upon retainer assembly 68 by two resilient metal clips 78 mounted thereto. Clips 78 retain slide 72 by grasping cardboard mount 76 without interfering with the transparent portion 74 (see FIG. 4). Retainer assembly 68 slideably rides upon runners 80 and 82 within copier 30. Runner 80 is formed as a groove between a baffle 66 and a wall surface 84 of support plate 52. Runner 82 is formed as a part of a wall surface 86 secured to a bottom wall 88. Retainer assembly 68 is configured having an opening 42 of a size substantially equal to the transparent portion 74 of slide 72. When slide 72 is properly mounted upon retained assembly 68, opening 42 and the transparent portions 74 physically coincide whereby light may pass through the transparent portion of slide 72 without interference from retainer assembly 68. Attached to support plate 52, and extending between side walls 36, is light baffle 66. Baffle 66 is operative to shield photographic transparency 72, contained within supporting structure 44, from any direct illumination passing through opening 56 from flash cube 14.

Mounted upon side walls 36 on the opposite side of slide-supporting structure 44 is a half-silvered mirror or "beam splitter" 90. Mirror 90 is attached at three points upon side walls 36 by brackets as at 92 and preferably is positioned so as to form an angle of 45 degrees with the optical axis of taking lens 46 of camera 10.

Positioned opposite supporting structure 44 and half-silvered mirror 90 is a concave magnifying mirror 94. Mirror 94 is attached to a backing structure 96. Positioned between backing structure 96 and end wall 40 are three adjustment bolts 100. Bolts 100 extend through openings 101 in end wall 40 and threadably engage backing structure 96. Coiled springs 98 are located between end wall 40 and circular indentations 103 provided in backing structure 96. Bolts 100 extend through springs 98 and may be selectively rotated from outside copier 30 for positioning mirror 94 optically coaxial with taking lens 46. Springs 98 bias backing structure 96 away from its threadable engagement with bolts 100.

OPERATION

Referring to FIGS. 1 and 2, depression of trigger member 26 activates a shutter mechanism (not shown) contained within camera 10, thereby commencing a photographic exposure. As an adjunct of shutter actuation, mechanisms (not shown) contained within camera 10 cause the ignition of a flash lamp contained within flash cube 14. Light emanating from the ignited lamp enters copier 30 along a light path through opening 56 and strikes diffuse reflecting surface 60 of assembly 59. Surface 60 diffuses light from the ignited lamp and reflects a substantial portion towards transparency 72. The intensity of light diffused towards slide 72 depends upon the angle at which surface 60 is positioned relative to flash cube 14 and transparency 72. When surface 60 is positioned (as shown in FIG. 2) at an angle of 45 degrees to the light path from flash cube 14, the maximum intensity of light will be diffused towards slide 72. To reduce the intensity of light reflected towards slide 72, surface 60 may be moved in a direction as shown by arrow 100. The diffused light from surface 60 is transmitted along a light path through slide 72 to half-silvered mirror 90. A substantial portion of the light incident upon mirror 90 is transmitted therethrough toward concave mirror 94. A portion of the light incident upon half-silvered mirror 94 may be reflected toward bottom wall 88. To prevent this light from reflecting off wall surface 88 towards taking lens and causing unwanted flair, a light-absorption material 102 is placed at bottom wall 88. Light-absorption material 102 may be constructed of various materials, such as black felt, light-absorbing paint, grooved black plastic, or various other substances. When a grooved black plastic is used, the light from half-silvered mirror 90 is reflected within the grooves several times. Each time the light is reflected, a substantial portion of it is absorbed until such time as the intensity of the light is negligible. The image projected from slide 72, which is incident upon mirror 94, is reflected for magnification back to half-silvered mirror 90 where it is, in turn, reflected through opening 58 toward taking lens 46. Taking lens 46 focuses the image from concave mirror 94 at the exposure plane (not shown) and exposes a portion of photographic material.

Figure 5:
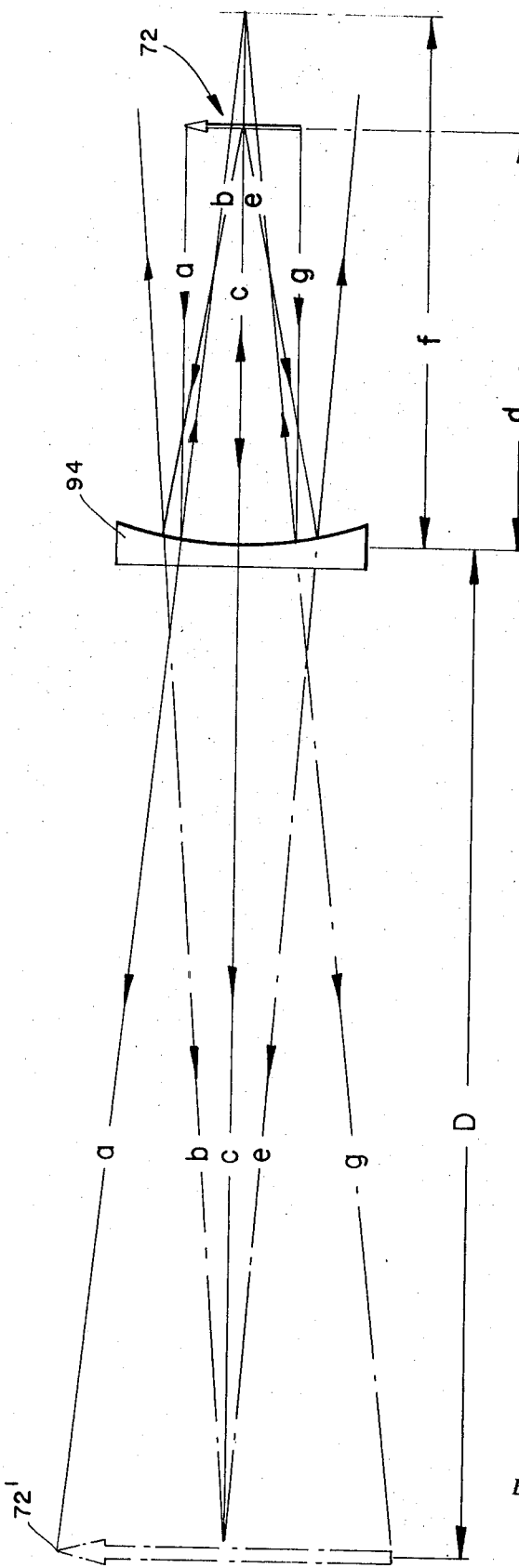
FIG. 5 is a ray diagram of a concave mirror with an object spaced from the mirror a distance less than the focal length of the mirror.

Magnification mirror 94 and a half-silvered mirror 90 are operative to establish a folded light path for a magnification of the image projected from slide 72. A magnified image is produced at the focal distance of lens 46 even though copier 30 is of relatively small size. In addition, the use of a copier having a folded light path permits the incorporation of camera mounted flash cube 14 for illumination of the slide 72 to be copied. Since reflection at mirror 94 is used to achieve magnification, spherical and chromatic aberrations are essentially eliminated. The technique used to achieve this result becomes more apparent in considering the equivalent ray diagram at FIG. 5. Referring to FIG. 5, slide 72 is placed a distance "$d$" from mirror 94 which is less than its focal length "$f$." Projected in the optical system, an image 72' of the transparency at 72 will be produced which is virtual, erect, magnified, and spaced a distance "$D$" behind mirror 94. The ratio of "$D/d$" represents the resulting magnification of slide 72.

By positioning half-silvered mirror 90 between slide 72 and concave mirror 94, the virtual image 72' thus produced may be "seen" within the optical system at hand without interference from slide 72. If a lens, such as taking lens 46, is placed opposite half-silvered mirror 90, it will in turn "see" the virtual image and focus it at an exposure plane. The use of a concave mirror, as opposed to a comparable lens system, results in an achromatic magnification system which may be housed in a copier of compact size.

In its preferred embodiment, copier 30 is used in combination with a relatively long focal length camera having a fixed-focus taking lens 46. Lens 46 is configured to focus an object at the exposure plane (not shown) of camera 10 when the object distance from lens 46 is equal to its focal length. Therefore, the image distance "$D$," the distance from concave mirror 94 to half-silvered mirror 90, and the distance from half-silvered mirror 90 to taking lens 46 should be equal to the focal distance of lens 46 if the virtual magnified image 72' is to be correctly focused at the exposure plane of camera 10. Additionally, the magnified virtual image produced at the focal distance of lens 46 should be of a size which fills the field of view of camera 10. If the image is magnified too much, cropping will result. If the image is not magnified enough, the image will not fill the field of view of camera 10 and a properly magnified reproduction of slide 72 will not be obtained. For this reason, the focal length of mirror 94, the placement of slide 72, correct placement of half-silvered mirror 90, and the magnification ratio are important.

Figure 6:
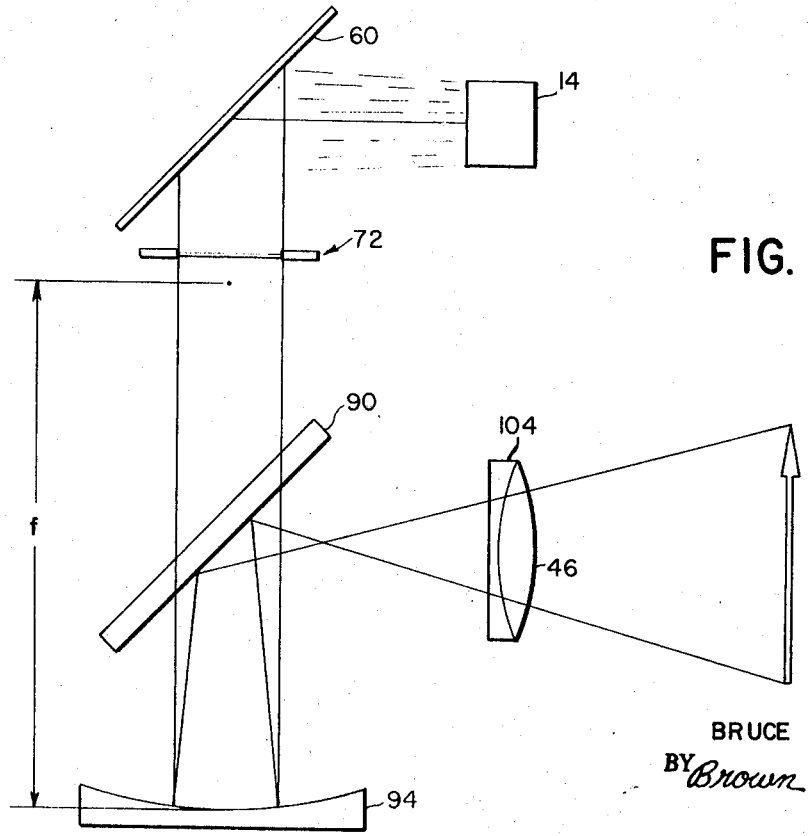
FIG. 6 is a schematic representation of a second embodiment of the present invention.

FIG. 6 shows a second embodiment of the present invention. In this embodiment, the internal components of copier 30 are rearranged such that slide 72 is spaced from concave mirror 94 a distance greater than the focal length of mirror 94. This alteration, while minimal in extent with respect to the earlier embodiment, produces a real, magnified, and inverted image within the optical system of copier 30. A negative miniscus lens 104 is added to the copier and is positioned in front of taking lens 46. Lens 104 serves to nullify the prismatic power of taking lens 46, thereby permitting the image to pass through a combination of lenses, having neutral power, and be projected toward and imaged at the exposure plane of camera 10. The image produced is of a size equal to that of the film format at the exposure plane. The rearrangement of the internal components does not enlarge the size of copier 30 and may be accomplished in two ways. First, slide 72 can be moved to a distance from concave mirror 94 which is greater than the focal length of mirror 94. A change in the magnification power of concave mirror 94 must also be made to counterbalance the repositioning of slide 72. Second, the focal length of concave mirror 94 may be shortened, effectively placing slide 72 outside the focal length of the mirror. The additional lens 104 of the second embodiment may be constructed to counterbalance any spherical or chromatic aberrations of taking lenses as at 46.

Figure 7:
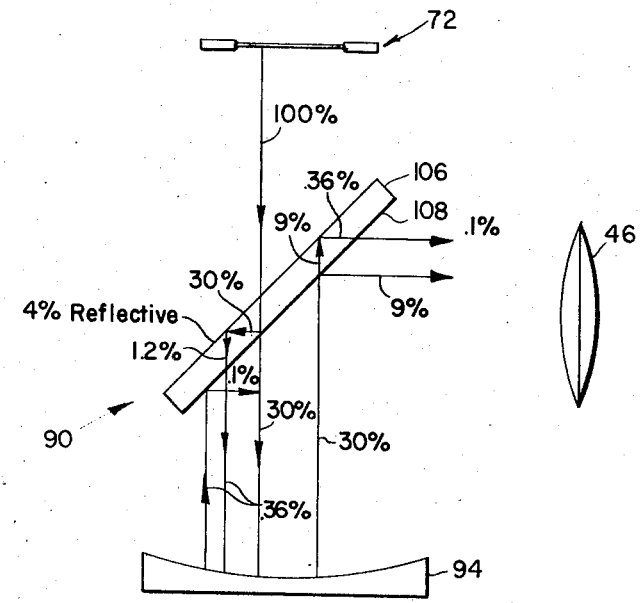
FIG. 7 is a diagram of primary and secondary reflections of a chromium coated beam splitter.

The construction of half-silvered mirror 90, commonly known as a "beam splitter," is well known in the field. A characteristic of all beam splitters is that they both reflect and transmit light which is incident upon them. In the embodiments discussed above, in addition to the primary image reflected toward taking lens 46, there may be secondary reflections from half-silvered mirror 90. These secondary reflections or "ghost images" may detract from the quality of the copy obtained and should be minimized. Among the various techniques for reducing these secondary reflections, it has been found that a chromium coated beam splitter is best suited for incorporation into the present invention. Referring to FIG. 7, the reflective, transmittive, and absorption percentages of a chromium coated beam splitter are shown. Thirty percent of the light incident upon the chromium coating will be reflected, 30 percent will be transmitted, and 40 percent will be absorbed.

Light passes through slide 72 and continues through a glass plate portion 106 of beam splitter 90 until it reaches the chromium coating 108. At this point, 40 percent of the light is absorbed, 30 percent is transmitted through the chromium coating, and 30 percent is reflected. That portion of the light which is reflected is again reflected off the upward portion of the glass plate which is 4 percent reflective. The transmitted portion is incident upon mirror 94 which redirects the light back toward beam splitter 90. Thirty percent of this light from mirror 94 will be reflected towards lens 46, 40 percent will be absorbed, and 30 percent will be transmitted. That portion of the light which is transmitted is reflected off the upward portion of the glass plate resulting in flair, or secondary reflections. The ratio of secondary reflections (0.2 percent) to the primary reflected light (9 percent) will be of the order of 1–45. This relatively small ratio of secondary reflections to the primary reflection results in a minimization of ghost images at the exposure plane.

In addition to merely coating a transparent sheet of glass, one may also coat a piece of filter glass which is operative to absorb greater portions of the light incident upon it. In this manner, the flair-to-reflection ratio is substantially reduced resulting in a minimum number of secondary reflections. A third alternative is to construct a pellicle by dipping a wire frame into a liquid plastic. When correctly positioned, primary and secondary reflections from the pellicle substantially coincide and double imaging from flair is negligible.

As may be evidenced from the foregoing, the photographic copier of the invention retains the capability of providing a photographic copy of a transparency of high quality while being fabricable using high volume, low-cost techniques. The copier uses a novel magnification system for providing aberration-free images. Further, due to the folded light path incorporated in the present invention, there is realized a compact design with the use of a camera-mounted source of illumination.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus for recording an image of a photographic transparency at the exposure plane of a camera having an optical axis and means for positioning photosensitive material of a given film format at said exposure plane, comprising:
   housing means connectable with said camera for directing light from a source of artificial illumination along a path;
   means within said path for diffusing said light from said source of artificial illumination;
   means within said housing means for supporting said transparency within said path in a position intercepting light from said diffusing means; and
   means within said housing means optically coaxial with said optical axis when said housing means is connected with said camera for reflecting and reimaging said transparency at said exposure plane.

2. Photographic apparatus for reproducing an image of a photographic transparency at the exposure plane of a photographic camera having means for mounting a light source at said camera directed generally forward in the direction of the optical axis of said camera, comprising:
   housing means connectable with the front of said camera for accepting light from said light source;
   means within said housing for redirecting light from said source in a direction transverse to the optical axis of said camera;
   means within said housing for supporting a transparency in a position intercepting the redirected light from said light source; and
   means including at least one mirror surface in said housing for reflecting light received from said transparency and for imaging said transparency at the exposure plane of said photographic camera.

3. Photographic apparatus for recording a magnified image of a photographic transparency at the exposure plane of a camera having a taking lens configured to record at said exposure plane the image of a scene of predetermined field extent at a given focal distance, comprising:
   housing means connectable with said camera for directing light from a source of artificial illumination along a path;
   means within said path for diffusing said light from said source of artificial illumination;
   means within said housing means for supporting said transparency within said path in a position intercepting light from said diffusing means;
   magnifying means optically coaxial with said taking lens when said housing means is connected with said camera for reflecting a magnified image of said transparency toward said taking lens, said magnifying means being so configured and spaced from said transparency to derive a virtual image thereof at a distance therefrom corresponding to predetermined focal distance of said taking lens and substantially coextensive with said given field extent.

4. The photographic apparatus of claim 3 in which said magnifying means includes a concave mirror positioned within said housing means and having a predetermined power for deriving said virtual image.

5. The photographic apparatus of claim 4 wherein said magnifying means includes partially transparent reflecting means positioned within said light path for reflecting light incident thereon from said concave mirror toward said taking lens and for transmitting light from said transparency toward said concave mirror.

6. The photographic apparatus of claim 3 in which said diffusing means is supported within said housing means and is selectively oriented to direct light from said source toward said transparency supporting means.

7. The photographic apparatus of claim 6 in which said diffusing means is operative to adjust the quantity of said light directed toward said transparency supporting means in correspondence with a selected orientation thereof.

8. Photographic apparatus for copying the image of a scene recorded upon a photographic transparency comprising:
   a photographic camera including a taking lens for imaging a scene within a given field of view at a given focal distance at an exposure plane;
   a source of artificial illumination mounted upon said camera;
   housing means for directing light along a path from said source toward said taking lens;
   means within said path for diffusing light from said source;
   means for supporting said transparency within said path in a position intercepting said diffused light; and,
   magnification means optically coaxial with said taking lens, spaced from said transparency and configured to reflect the image thereof toward said taking lens and derive a virtual image coextensive with said given field of view, whereby a magnified image of said transparency may be imaged at said exposure plane.

9. Photographic apparatus according to claim 8 in which said magnification means comprises:
   reflective magnification means optically coaxial with said taking lens for deriving a magnified virtual image of said transparency; and
   semi-reflective means positioned within said path, for reflecting said magnified image toward said picture-taking lens.

10. Photographic apparatus according to claim 9 in which said semi-reflective means is positioned between said means for supporting said transparency and said reflective magnification means, said semi-reflective means being configured to permit said light from said source to pass from said transparency to said reflective magnification means and being further configured to reflect said magnified image from said reflective magnification means toward said taking lens.

11. The photographic apparatus of claim 8 in which said reflective magnification means includes a concave mirror positioned within said housing means and selectively spaced from said transparency for deriving said virtual image.

12. The photographic apparatus of claim 8 in which said means for diffusing light from said source is supported within said housing means and is selectively orientated for directing light from said source toward said means for supporting said transparency.

13. The photographic apparatus of claim 12 in which said means for diffusing light is operative to adjust the quantity of said light directed toward said means for supporting said transparency in correspondence with given orientations thereof.

14. Photographic apparatus for recording a magnified image of a photographic transparency at the exposure plane of a camera having a taking optical system for imaging a scene within a given film format at said exposure plane, comprising:
 housing means connectable with said camera for directing light from a source of artificial illumination along a path;
 means within said path for diffusing said light from said source of artificial illumination;
 means within said housing means for supporting said transparency within said path in a position intercepting light from said diffusing means;
 means for annulling the prismatic power of said camera optical system; and
 magnifying means within said housing means optically coaxial with said camera optical system when said housing means is connected with said camera for reflectively magnifying and imaging said transparency at said exposure plane, said magnified image being substantially coextensive with said given film format.

15. The photographic apparatus of claim 14 in which said magnifying means includes a concave mirror positioned within said housing means and having a predetermined power for reflectively magnifying and imaging said scene at said exposure plane.

16. The photographic apparatus of claim 15 in which said magnifying means includes partially transparent reflecting means positioned within said light path for reflecting light incident thereon from said concave mirror toward said exposure plane and for transmitting light from said transparency toward said concave mirror.

17. The photographic apparatus of claim 14 in which said means for diffusing light from said source is supported within said housing means and is selectively oriented to direct light from said source toward said means for supporting said transparency.

18. The photographic apparatus of claim 17 in which said means for diffusing light from said source is operative to selectively vary the quantity of light directed toward said means for supporting said transparency in correspondence with given orientations thereof.

19. The photographic apparatus of claim 14 wherein said means for annulling said prismatic power of said camera optical system is formed as a negative lens mounted within said housing means located in front of said camera optical system, said negative lens being operative to permit said magnified image of said transparency to be projected toward and focused at said exposure plane.

* * * * *